(12) United States Patent
Breindel et al.

(10) Patent No.: US 6,509,395 B2
(45) Date of Patent: Jan. 21, 2003

(54) DEFOAMERS FOR PIGMENT DISPERSANTS

(75) Inventors: Kenneth Breindel, Lansdale, PA (US); David W. Brown, Ambler, PA (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/801,509

(22) Filed: Mar. 8, 2001

(65) Prior Publication Data

US 2001/0031813 A1 Oct. 18, 2001

Related U.S. Application Data

(60) Provisional application No. 60/188,091, filed on Mar. 9, 2000.

(51) Int. Cl.$^7$ .............................................. C08L 63/00
(52) U.S. Cl. ........................ 523/400; 523/435; 523/437; 525/93
(58) Field of Search ................................ 523/400, 435, 523/437; 525/93

(56) References Cited

U.S. PATENT DOCUMENTS

| | | |
|---|---|---|
| 5,623,004 A | 4/1997 | Bertram et al. |
| 5,766,812 A | 6/1998 | Malhotra |
| 5,827,453 A | 10/1998 | Gross et al. |
| 5,895,605 A | 4/1999 | Gross et al. |
| 6,110,977 A | 8/2000 | Gross et al. |

*Primary Examiner*—Edward J. Cain
(74) *Attorney, Agent, or Firm*—John E. Drach; Henry E. Millson, Jr.

(57) ABSTRACT

Branched polymer defoamers for pigment dispersants. The branched polymers are the reaction products of a linking agent defined by formula (I):

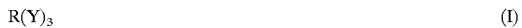

$$R(Y)_3 \qquad (I)$$

wherein each Y group is a halogen atom or one Y group is a halogen atom and two Y groups together represent an epoxy oxygen atom, which is attached to two adjacent carbon atoms in the R group to form an epoxy group, and R is an alkanetriyl group containing from 3 to 10 carbon atoms, and b) at least one compound having the formula (II)

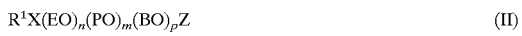

$$R^1X(EO)_n(PO)_m(BO)_pZ \qquad (II)$$

wherein $R^1$ is a substituted or unsubstituted, saturated or unsaturated, organic group having from 4 to 36 carbon atoms; x is —O—, —S—, or —NR$^2$—where R$^2$ is hydrogen or a $C_1$–$C_4$ alkyl group; Z is hydrogen, —NHR$^2$ in place of a terminal —O— group wherein R$^2$ has the meaning given above, or —SH, in which the —SH group is present in place of a terminal —O— group; n is a number of from 0 to 100, e.g., from 1 to 100; m is a number of from 0 to 50 e.g., from 1 to 50; and p is a number of from 0 to 50 e.g., from 1 to 50; provided that the sum of n, m, and p is at least 1; and wherein EO, PO and BO groups when present can be in random and/or block distribution and can be in any order with respect to the X group.

47 Claims, No Drawings

DEFOAMERS FOR PIGMENT DISPERSANTS

CROSS-REFERENCE TO RELATED APPLICATIONS

This application claims the benefit of copending provisional application Ser. No. 60/188,091, filed on Mar. 9, 2000, the entire contents of which are incorporated herein by reference.

FIELD OF THE INVENTION

This invention relates to hydrophobic pigment dispersants, to compositions containing them, and to compounds for defoaming them.

BACKGROUND OF THE INVENTION

Pigment dispersants, especially hydrophobic pigment dispersants, are known to both generate and stabilize large quantities of foam when added to aqueous compositions containing pigments.

This foaming propensity is highly disadvantageous, and is particularly troublesome when the dispersants are used to disperse pigments present in water-based paints.

SUMMARY OF THE INVENTION

This invention relates to aqueous-based compositions containing pigments and pigment dispersants, and more particularly to compositions containing pigment dispersants, especially hydrophobic pigment dispersants, and a branched polymer as a defoaming agent.

The branched polymers used in the above compositions are the reaction products of a linking agent defined by formula (I):

$$R(Y)_3 \qquad (I)$$

wherein each Y group is a halogen atom or one Y group is a halogen atom and two Y groups together represent an epoxy oxygen atom, which is attached to two adjacent carbon atoms in the R group to form an epoxy group, and R is an alkanetriyl group containing from 3 to 10 carbon atoms, the preferred linking agent being epichlorohydrin; and at least one compound having the formula (II)

$$R^1X(EO)_n(PO)_m(BO)_pZ \qquad (II)$$

wherein $R^1$ is a substituted or unsubstituted, saturated or unsaturated, organic group having from 4 to 36 carbon atoms; x is —O—, —S—, or —NR$^2$—where $R^2$ is hydrogen or a $C_1$–$C_4$ alkyl group; Z is hydrogen, —NHR$^2$ in place of a terminal —O— group wherein $R^2$ has the meaning given above, or —SH, in which the —SH group is present in place of a terminal —O— group; n is a number of from 0 to 100, e.g., from 1 to 100; m is a number of from 0 to 50 e.g., from 1 to 50; and p is a number of from 0 to 50 e.g., from 1 to 50; provided that the sum of n, m, and p is at least 1;

wherein EO represents the residue of ethylene oxide, PO represents the residue of propylene oxide, and BO represents the residue of butylene oxide; and wherein the EO, PO and BO groups when present can be in random and/or block distribution and can be in any order with respect to the X group. When the term "branched polymer" is used herein it is to be understood to refer to one or more of the above reaction products.

DESCRIPTION OF THE PREFERRED EMBODIMENTS

Other than in the operating examples, or where otherwise indicated, all numbers expressing quantities of ingredients or reaction conditions used herein are to be understood as modified in all instances by the term "about". Also, throughout this description, unless expressly stated to the contrary; percent, "parts" of, and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ by chemical reactions specified in the description, and does not necessarily preclude other chemical interactions among the constituents of a mixture once mixed.

In the branched polymers used in the practice of the invention, in the formula II reactant, formula II compounds wherein the sum of n, m, and p is at least 2, especially at least 3, are preferred. Examples of $R^1$ groups include substituted or unsubstituted alkyl groups having from 4 to 36 carbon atoms, preferably from 4 to 22 carbon atoms, alkenyl and alkynyl groups having from 4 to 36 carbon atoms, preferably from 4 to 22 carbon atoms, aryl groups having from 6 to 26 carbon atoms, and arenyl groups having from 7 to 36 carbon atoms. When the above groups are substituted groups, the groups can contain single or multiple substitutions such as a halogen substitution, for example Cl, Fl, I and Br. a sulfur functionality such as a mercaptan or thio group; a nitrogen functionality such as an amine or amide functionality; a silicon functionality; or any combination thereof.

The $R^1$ group can be any substituted or unsubstituted, saturated or unsaturated organic moiety having from 4 to 36 carbon atoms. Thus, the $R^1$ groups can be linear or branched alkyl groups, linear or branched alkenyl or alkynyl groups, saturated carbocyclic moieties having one or more multiple bonds, saturated heterocyclic moieties, unsaturated heterocyclic moieties having one or more multiple bonds, substituted linear or branched alkyl groups, substituted linear or branched alkenyl or alkynyl groups, substituted saturated carbocyclic moieties, substituted unsaturated carbocyclic moieties having one or more multiple bonds, substituted saturated heterocyclic moieties, and substituted unsaturated heterocyclic moieties having one or more multiple bonds. Examples of the above include but are not limited to an alkyl group having form 4 to 22 carbon atoms, an alkenyl group having from 4 to 22 carbon atoms, and an alkynyl group having from 4 to 22 carbon atoms. $R^1$ can also be an arenyl group. Arenyl groups are alkyl-substituted aromatic radicals having a free valence at an alkyl carbon atom such as a benzylic group. Alkyl groups having from 4 to 12 carbon atoms are preferred, and alkyl groups having from 8 to 10 carbon atoms are most preferred. The degree of ethoxylation is preferably from 2 to about 50, more preferably from 3 to about 50, with the most preferred being from 4 to 50, while the degree of propoxylation and butoxylation can vary from 0 to about 50, e.g. from 0 to about 10. The degree of propoxylation and/or butoxylation will be determined by the desired degree of water solubility or miscibility. The water solubility or miscibility will ultimately be determined by such factors as the number of carbon atoms in $R^1$, the relative amounts EO, PO and BO, and the effect of PO and BO on the biodegradability of the branched polymer. The water solubility or miscibility of a branched polymer according to the invention and the interrelationships between the number of carbon atoms in $R^1$, the relative amounts of EO, PO and BO and the biodegradability of the final product will be readily determinable by one of ordinary skill in the art.

When the Z group of formula (II) is a mercapto group, examples of such compounds include but are not limited to, alkoxylated dodecyl mercaptan and alkoxylated 1-hexadecanethiol.

When the X group is —NR²—, the compounds of formula (II) are alkoxylated amines. When the compounds of formula II are alkoxylated amines, n is a number from 0 to 50, preferably from 1 to 50, m is a number from 0 to 50 and p is a number from 0 to 50, preferably from 1 to 50, provided that the sum of n, m, and p is at least 1. Examples of the alkoxylated amines useful for the purposes of the invention include but are not limited to, alkoxylated dibutyl amine, alkoxylated dicyclohexyl amine, alkoxylated diethylethanolamine, and alkoxylated dioctylamine.

The mole ratio of the linking compound (I) to (II) is from about 0.4/1 to about 5/1, preferably from about 0.4/1 to about 2/1 and more preferably from about 0.6/1 to about 1.6/1.

Optionally an additional component can be reacted with the linking agent of formula (I) and the compound of formula (II). A glycidyl ether or amine can be added to the reaction of formula (I) and formula (II). The amount of the glycidyl ether or glycidyl amine is from about 1 to about 20 mole percent based on the moles of the compounds of formula (II) used in the reaction. When the glycidyl ether or glycidyl amine is added to the monofunctional starting material of formula (II), the ratio of formula (I) to formula (II) plus the glycidyl ether or glycidyl amine is preferably from about 0.8 to about 1.4. Examples of the glycidyl ethers include but are not limited to, PEG 600 Diglycidyl ether, TETRONIC™ 701 Tetraglycidyl ether, Triglycidyl DI or Triethanolamine, Polyoxyethylene (POE) 200 Tallow amine diglycidyl ether, Propoxylated (POP10) Trimethylol propane triglycidyl ether, Propoxylated (POP7) Pentaerythritol tetraglycidyl ether. Examples of Glycidyl amines include but are not limited to, Tetraglycidyl-1,6-Hexane diamine, Tetraglycidyl JEFFAMINE™ EDR-148, and Tetraglycidyl Isophorone diamine.

In the reaction products used in the invention, the linking agent of formula (I) is preferably epichlorohydrin although other epihalohydrins can be used. Also, trihaloalkanes can be used, such as 1,2,3-trichloropropane, 1,2,4-trichlorobutane, 1,3,6-trichlorohexane and the like. Instead of chlorine in the epihalohydrins and the trihaloalkanes, the corresponding bromine and iodine compounds can also be used, including compounds containing two or even three of the above halogens.

In the compounds of formula II where Z is —NHR², the corresponding compound of formula II wherein Z is —OH can be converted to —Cl or —Br and then reacted with ammonia or a $C_1$—$C_4$ primary amine. Where Z is —SH, the corresponding compound in which Z is —OH can be converted to the mercaptan by methods well known to the art, e.g. by the reaction of the corresponding —Cl or —Br compound with sodium hydrosulfide.

Preferred compounds of formula II have the following formula III:

$$R^1O(EO)_n(PO)_m(BO)_pH \quad\quad (III)$$

in which $R^1$, n, m, and p have the meanings given above.

In the compounds of formula II and III, it is understood that EO stands for the residue of ethylene oxide, PO stands for the residue of propylene oxide and BO stands for the residue of butylene oxide. Also, in the compounds of formula II and III, the EO, PO, and BO groups, when present, can be in any order with respect to the $R^1$ X or $R^1$ O group, and can be in blocks and/or in random distribution, although the alkoxide groups present are preferably present in the order shown in formulae II and III.

The reaction between reactants A) and B) can be carried out by reacting the components at a temperature in the range of from 90 to 150° C., preferably from 100 to 110° C., in the presence of a basic catalyst, such as a concentrated aqueous alkali or alkaline earth metal hydroxide. Sodium hydroxide and potassium hydroxide are preferred. The reaction is preferably carried out in the presence of an inert organic solvent that azeotropes water, i.e. toluene, and at a temperature that drives off the azeotrope.

The pigment dispersants are anionic polymeric pigment dispersants, and are usually copolymers or terpolymers of maleic anhydride or maleic acid, e.g. diisobutylene/maleic anhydride copolymer and a terpolymer of maleic anhydridelmethacrylic acid/styrene.

Compositions containing a pigment dispersant and a branched polymer can be used as an additive to disperse pigments in aqueous-based products. These compositions can be anhydrous or can be diluted with water if desired. The branched polymer is present in the compositions in a quantity of from 0.05% to 20%, preferably from 0.05 to 5% and more preferably from 0.1 to 2.5%, based on the weight of pigment dispersant. Such relatively small quantities of branched polymer results in virtually no stable foam when the composition is added to pigment-containing aqueous based products, such as latex paints and the like. In addition, the branched polymer is miscible in the pigment dispersant, resulting in a clear, homogeneous product.

When the compositions containing the pigment dispersant and the branched polymer are used to disperse pigments in aqueous-based paint compositions, substrates coated with the resulting paint exhibit a coating that is even, bubble-free, and has exceptionally high gloss combined with very high water resistance.

While the branched polymers are preferably combined with pigment dispersants to be used as additives to pigment—containing aqueous-based products, the pigment dispersants and the branched polymers can of course be added separately. The same relative quantity of branched polymer, based on the quantity of pigment dispersant, is added to the pigment—containing aqueous based product.

In general, the pigment dispersant, whether combined with the branched polymer as an additive, or added separately, is generally added in a quantity of from 0.05 to 2.0% dispersant solids, based on the weight of the pigment in the product.

The pigment—containing aqueous based products can be paints or other pigment—containing products such as filled adhesives, rubber/polymeric materials (e.g. carpet backing), stucco, grouts, textured coatings, cements, concrete, pigment dispersion concentrates, caulks, sealants, paper coatings, and highly filled thermosetting polymer systems.

Latex paint compositions can contain, in addition to pigments, latex polymer particles, thickeners, protective colloids, flow agents, surfactants, catalysts, wetting agents, other defoamers, and plasticizers. Pigments that can be used in latex paints include, but are not limited to, titanium dioxide (rutile), mica, calcium carbonate, clay, talc, silica and wollastonite. Some of the above pigments are sometimes referred to as extended pigments.

The invention will be illustrated but not limited by the following examples.

EXAMPLES

EXAMPLE 1

100Ml of a 1% by weight aqueous solution of TAMOL® 731 (Rohm+Haas Co.), which is a copolymer pigment dispersant prepared by the copolymerization of diisobutylene and maleic anhydride, was prepared in a 200 ml. glass bottle. The bottle was hand shaken. The head space in the bottle was filled with a stable foam.

One drop of the reaction product of epichlorohydrin and decyl alcohol . 4EO in a 1:1 epi: OH ratio was added to 100 ml of the above copolymer dispersant. A clear, homogeneous solution was obtained.

1 Gram of the above clear, homogeneous solution was added to 99 ml. of water in a 200 ml. glass bottle. The bottle was then hand shaken. No stable foam was present. After one month, the bottle was again hand shaken. Once again, no stable foam was present.

EXAMPLE 2

100Ml. of a 1% by weight aqueous solution of a hydrophobic dispersant which is a terpolymer of maleic anhydridelmethacrylic acid/styrene, was prepared in a 200 ml. glass bottle. The bottle was hand shaken. The head space in the bottle was filled with a stable foam.

One drop of the same reaction product used in Example 1 was added to 100ml. of the above terpolymer. A clear homogenous solution was obtained.

1 Gram of the above clear, homogeneous solution was added to 99 mi. of water in a 200 ml. glass bottle. The bottle was then hand shaken. No stable foam was present. After one month, the bottle was again hand shaken. Once again no stable foam was present.

EXAMPLE 3

The process of Example 1 was repeated except that instead of the reaction product of epichlorohydrin and decyl alcohol . 4EO, the reaction product of epichlorohydrin and dodecyl alcohol . 4EO in a 1:1 epi: OH ratio was employed. The same results were obtained.

EXAMPLE 4

The process of Example 1 was repeated except that instead of the reaction product of epichiorohydrin and decyl alcohol . 4EO, the reaction product of epichlorohydrin and decyl alcohol . 6E0 in a 1:1 epi: OH ratio was employed. The same results were obtained.

EXAMPLE 5

The process of Example 1 was repeated except that instead of the reaction product of epichlorohydrin and decyl alcohol . 4EO, the reaction product of epichlorohydrin and nonyl phenol . 4EO in a 1:1 epi: OH ratio was employed.

The same results were obtained.

What is claimed is:

1. A composition comprising

A) a pigment dispersant; and

B) a branched reaction product of
   a) a linking agent defined by formula (I)

$$R(Y)_3 \tag{I}$$

wherein each Y group is a halogen atom or one Y group is a halogen atom and two Y groups together represent an epoxy oxygen atom, which is attached to two adjacent carbon atoms in the R group to form an epoxy group, and $R^4$ is an alkanetriyl group containing from 3 to 10 carbon atoms; and b) at least one compound having the formula (II)

$$R^1X(EO)_n(PO)_m(BO)_pZ \tag{II}$$

wherein $R^1$ is a substituted or unsubstituted, saturated or unsaturated, organic group having from 4 to 36 carbon atoms; x is —O—, —S—, or —NR$^2$— where $R^2$ is hydrogen or a $C_1$—$C_4$ alkyl group; Z is hydrogen, —NHR$^2$ in place of a terminal —O— group wherein $R^2$ has the meaning given above, or —SH, in which the —SH group is present in place of a terminal —O— group; n is a number of from 0 to 100; m is a number of from 0 to 50; and p is a number of from 0 to 50; provided that the sum of n, m, and p is at least 1;

wherein EO represents the residue of ethylene oxide, PO represents the residue of propylene oxide, and BO represents the residue of butylene oxide; and wherein the EO, PO and BO groups when present can be in random and/or block distribution and can be in any order with respect to the X group.

2. The composition of claim 1 wherein in component B) a), the linking agent is epichlorohydrin.

3. The composition of claim 1 wherein in component B) b), the sum of n, m, and p is at least 2.

4. The composition of claim 3 wherein the sum of n, m, and p is at least 3.

5. The composition of claim 1 wherein in component B) b) Rlis an alkyl group having from 4 to 12 carbon atoms.

6. The composition of claim 5 wherein the alkyl group contains from 8 to 10 carbon atoms.

7. The composition of claim 1 wherein in component B) b) n is a number of from 2 to about 50.

8. The composition of claim 1 wherein in component B) b) R's an alkyl group having from 4 to 12 carbon atoms and n is a number from about 2 to about 50.

9. The composition of claim 1 wherein in component B) b) $R^1$ is an alkyl group having from 8 to 10 carbon atoms and n is a number from about 4 to about 50.

10. The composition of claim 1 wherein in component B) b), X is —O—.

11. The composition of claim 1 wherein in component B) b), X is —S—.

12. The composition of claim 1 wherein in component B)b), X is —NR$^2$—.

13. The composition of claim 1 wherein in component B), the mole ratio of component a) to component b) is from about 0.4:1 to about 5:1.

14. The composition of claim 12 wherein said mole ratio is from about 0.4:1 to about 2:1.

15. The composition of claim 13 wherein said mole ratio is from about 0.6:1 to about 1.6:1.

16. The composition of claim 13 wherein said mole ratio is about 1:1.

17. The composition of claim 1 wherein component B) a) is epichlorohydrin; in component B) b) the sum of n, m, and p is at least 2; and the mole ratio of component B) a) to component B) b) is from about 0.4:1 to about 5:1.

18. The composition of claim 1 wherein component B) is present in the composition in a quantity of from about 0.01% to about 20%, based on the weight of component A).

19. The composition of claim 18 wherein said quantity is from about 0.05% to about 5%.

20. The composition of claim 1 wherein component A) is an anionic polymer of maleic anhydride or maleic acid and at least one other monomer.

21. The composition of claim 1 wherein the EO, PO and BO groups when present in component B)b) are in block form and are in the order shown in formula II.

22. The composition of claim 1 wherein component B)b) has the formula $$R^1O(EO)_n(PO)_m(BO)_pH \quad (III)$$

in which $R^1$, n, m, and p have the meanings given in claim 1.

23. The composition of claim 22 wherein $R^1$ is a $C_4$–$C_{36}$ alkyl group.

24. The composition of claim 23 wherein the alkyl group contains from 4 to 22 carbon atoms.

25. The composition of claim 22 wherein the sum of n, m, and p is at least 2.

26. The composition of claim 25 wherein said sum is at least 3.

27. The composition of claim 25 wherein the sum of n, m, and p is from 2 to 50.

28. The composition of claim 22 wherein n is a number of from 2 to 50, and m and p are each zero.

29. In a composition containing a pigment dispersant, the improvement wherein the composition also contains a foam reducing quantity of a branched reaction product of a) a linking agent of formula (I)

$$R(Y)_3 \quad (I)$$

wherein each Y group is a halogen atom or one Y group is a halogen atom and two Y groups together represent an epoxy oxygen atom, which is attached to two adjacent carbon atoms in the R group to form an epoxy group, and R is an alkanetriyl group containing from 3 to 10 carbon atoms; and b) at least one compound having the formula (II)

$$R^1X(EO)_n(PO)_m(BO)_pZ \quad (II)$$

wherein $R^1$ is a substituted or unsubstituted, saturated or unsaturated, organic group having from 4 to 36 carbon atoms; x is —O—, —S—, or —NR²— where $R^2$ is hydrogen or a $C_1$–$C_4$ alkyl group; Z is hydrogen, —NHR² in place of a terminal —O— group wherein $R^2$ has the meaning given above, or —SH, in which the —SH group is present in place of a terminal —O— group; n is a number of from 0 to 100; m is a number of from 0 to 50; and p is a number of from 0 to 50; provided that the sum of n, m, and p is at least 1;

wherein EO represents the residue of ethylene oxide, PO represents the residue of propylene oxide, and BO represents the residue of butylene oxide; and wherein the EO, PO and BO groups when present can be in random and/or block distribution and can be in any order with respect to the X group.

30. The composition of claim 29 wherein the pigment dispersant is an anionic polymer of maleic anhydride or maleic acid and at least one other monomer.

31. The composition of claim 29 wherein the foam reducing quantity is from about 0.01 % to about 20%, based on the weight of the pigment dispersant.

32. The composition of claim 19 wherein the EO, PO, and BO groups when present are in block form and are in the order shown in formula II.

33. A composition comprising

I) at least one pigment;

II) a pigment dispersant; and

III) a branched reaction product of a) a linking agent of formula (I):

$$R(Y)_3 \quad (I)$$

wherein each Y group is a halogen atom or one Y group is a halogen atom and two Y groups together represent an epoxy oxygen atom, which is attached to two adjacent carbon atoms in the R group to form an epoxy group, and R is an alkanetriyl group containing from 3 to 10 carbon atoms; and b) at least one compound having the formula (II)

$$R^1X(EO)_n(PO)_m(BO)_pZ \quad (II)$$

wherein $R^1$ is a substituted or unsubstituted, saturated or unsaturated, organic group having from 4 to 36 carbon atoms; x is —O—, —S—, or —NR²— where $R^2$ is hydrogen or a $C_1$–$C_4$ alkyl group; Z is hydrogen, —NHR² in place of a terminal —O— group wherein $R^2$ has the meaning given above, or —SH, in which the —SH group is present in place of a terminal —O— group; n is a number of from 0 to 100; m is a number of from 0 to 50; and p is a number of from 0 to 50; provided that the sum of n, m, and p is at least 1;

wherein EO represents the residue of ethylene oxide, PO represents the residue of propylene oxide, and BO represents the residue of butylene oxide; and wherein the EO, PO and BO groups when present can be in random and/or block distribution and can be in any order with respect to the X group.

34. The composition of claim 33 wherein in component II) B) a), the linking agent is epichlorohydrin.

35. The composition of claim 33 wherein in component II) B) b), the sum of n, m, and p is at least 2.

36. The composition of claim 35 wherein the sum of n, m, and p is at least 3.

37. The composition of claim 33 wherein the EO, P0, and BO when present are in block form and are in the order shown in formula II.

38. The composition of claim 33 wherein in component II) B) b) $R^1$ is an alkyl group having from 4 to 12 carbon atoms.

39. The composition of claim 38 wherein the alkyl group contains from 8 to 10 carbon atoms.

40. The composition of claim 33 wherein in component II) B) b) n is a number of from 2 to about 50.

41. The composition of claim 33 wherein in component II) B) b) $R^1$ is an alkyl group having from 4 to 12 carbon atoms and n is a number from about 2 to about 50.

42. The composition of claim 33 wherein in component II) B) b) $R^1$ is an alkyl group having from 8 to 10 carbon atoms and n Is a number from about 4 to about 50.

43. The composition of claim 33 wherein component II) is an anionic polymer of maleic anhydride or maleic acid and at least one other monomer.

44. The composition of claim 33 wherein component III is present in from about 0.01% to about 20%, based on the weight of the component II) pigment dispersant.

45. The composition of claim 1 wherein component A) is a hydrophobic pigment dispersant.

46. The composition of claim 29 wherein the pigment dispersant is a hydrophobic pigment dispersant.

47. The composition of claim 33 wherein component II) is a hydrophobic pigment dispersant.

* * * * *